2,944,991
Patented July 12, 1960

2,944,991
PROCESS FOR POST-BODYING STYRENATED OIL-MODIFIED ALKYD RESINS

William F. Hart, Pittsburgh, Pa., assignor to American Cyanamid Company, New York, N.Y., a corporation of Maine No Drawing. Filed Aug. 30, 1956, Ser. No. 606,984

5 Claims. (Cl. 260—22)

This invention relates to a process for increasing the viscosity of a styrenated oil modified alkyd resin to a predetermined level. Still further, this invention relates to a process for preparing coating compositions comprising styrenated oil modified alkyd resins dispersed in an inert organic solvent prepared to a predetermined viscosity level by practice of the process of the present invention. Still further, this invention relates to a process for the preparation of coating compositions such as styrenated oil modified alkyl resins comprising adding to said resin a selected amount of an organic peroxide catalyst and heat reacting the mixture of catalyst and resin with constant agitation until the desired viscosity is reached, wherein the alkyd resin prior to said treatment cannot be made significantly more viscous by heating alone at conventional polymerization temperatures.

One of the objects of the present invention is to post-body a preformed styrenated oil modified alkyd resin containing minor amounts of residual monomer which comprises heat reacting said resin with freshly added organic peroxide catalyst. A further object of the present invention is to produce coating compositions comprising styrenated oil modified alkyd resins which have been post-bodied by heat reacting the same with freshly added organic peroxide catalyst until a preselected viscosity is reached. These and other objects of the present invention will be discussed in greater detail hereinbelow.

The styrenated oil modified alkyd resins used in the present invention may be prepared in a plurality of ways. For instance, an oil modified alkyd resin may be prepared which is then reacted with a polymerizable monomeric styrene or a selected glyceride oil is polymerized with a monomeric styrene and thereafter said styrenated oil is heat reacted in the presence of a polyhydric alcohol and a polycarboxylic acid which is free of non-benzenoid unsaturation. The former type of styrenated alkyd resin is sometimes referred to as a preformed alkyd resin whereas the latter type is sometimes referred to as a post-formed alkyd resin. It is immaterial which of these two are selected for use in the practice of the process of the present invention. The concept of the present invention is, however, limited to those styrenated oil modified alkyd resins which are not sufficiently viscous to meet the specification requirements of a coatings manufacturer and which resins contain relatively small amounts of residual monomer such as styrene. Still further, the present invention is limited, with respect to starting materials, to those styrenated alkyd resins which, although containing minor amounts of residual monomer, cannot be rendered significantly more viscous even by prolonged heating at conventional polymerization temperatures without the fresh addition of an organic peroxide catalyst.

In the preparation of alkyd resins, particularly those that are used in the field of coatings, it is generally desired to heat react a polyhydric alcohol and a polycarboxylic acid in the presence of a glyceride oil. Among the polyhydric alcohols which may be used in the preparation of these alkyd resins, are glycerol, ethylene glycol, diethylene glycol, propylene glycol, dipropylene glycol, trimethylene glycol, tetramethylene glycol, pinacol, arabitol, xylitol, adonitol, mannitol, trimethylol propane, trimethylol ethane, sorbitol, pentaerythritol, dipentaerythritol, the alkane diols such as butane diol-1,2, butane diol-1,3, butane diol-1,4, pentane diol-1,5, pentane diol-1,4, hexane diol-1,4, hexane diol-1,6, and the like. Quite obviously, these polyhydric alcohols may be used either singly or in combination with one another.

Among the polycarboxylic acids which are generally used in the preparation of alkyd resins, are those which are free of non-benzenoid unsaturation. Ordinarily, this saturated type of acid is used in amounts approximating at least about 90% by weight based on the total amount of polycarboxylic acid used. The remaining polycarboxylic acid may be an alpha, beta ethylenically unsaturated polycarboxylic acid such as maleic, fumaric, aconitic, itaconic, alpha-chloro maleic and the like. Whenever available, the anhydrides of these acids may be used. Quite obviously, these unsaturated acids may be used either singly or in combination with one another or they may be left out altogether but in no event, should they be present in an amount exceeding 10% by weight based on the total weight of polycarboxylic acid present in the present invention.

Illustrative of the polycarboxylic acids which are free of non-benzenoid unsaturation which may be used to prepare the alkyd resins used in the present invention are phthalic, oxalic, malonic, succinic, glutaric, sebacic, adipic, pimelic, subaric, azaleic, tricarballylic, citric, tartaric, malic and the like. Whenever available, anhydrides of these acids may be used. Quite obviously, these acids and/or their anhydrides may be used either singly or in combination with one another. The preferred polycarboxylic acid is phthalic acid or its anhydride. The preferred polyhydric alcohol is glycerol.

The alkyd resins used in the present invention are modified by co-reaction with a glyceride oil. These oils may be either non-drying, semi-drying or drying glyceride oils. If desired, one could use instead of said oils, the fatty acids derived therefrom or, if desired, the monoglycerides of said fatty acids. Ordinarily, it is preferred to use either the semi-drying or the drying glyceride oils, their fatty acids or monoglycerides. A still further approach in the preparation of the alkyd resins used in the present invention resides in using an ester interchanged technique for the preparation of the fatty acid modified alkyd resin. In such an approach, the methyl ester of these fatty acids is first prepared and is then reacted with the polycarboxylic acid and the polyhydric alcohol to produce a fatty acid modified alkyd resin. Among the oils which may be used in the practice of the process of the present invention are coconut oil, palm oil, babassu oil, murumuru oil, mustard seed oil, olive oil, rape seed oil, sesame, corn oil, cottonseed oil, soya oil, sunflower oil, walnut oil, linseed oil, perilla oil, castor oil, either raw or dehydrated, tung oil, oiticica, whale oil, menhaden oil, sardine oil, herring oil, and the like. Quite obviously, these oils may be used either singly or in combination with one another or mixtures of the oils and their fatty acids may be used. Illustrative of the fatty acids which may be used are caprylic, capric, lauric, myristic, palmitic, stearic, arachidic, behenic, lignoceric, myristoleic, palmitoleic, oleic, linoleic, linolenic, elaeostearic, licanic, ricinoleic, erucic and the like.

After the oil modified alkyd resin is prepared, it is generally desirable to co-react said preformed alkyd resin with a monomeric styrene material. In the preparation of the oil alkyd resin itself, no solvent is generally used nor is it desirable to make use of the said solvent. In the styrenation reaction, however, it is generally desirable that there be present an inert organic solvent. The selection of a solvent is generally a matter of choice depending on whether or not the ultimate composition will have utility as an architectural, either indoor or outdoor, or is to be used for the coating of appliances such as washing machines, refrigerators, toys, automobiles and the like. One could make use of such solvents as benzene, toluene, xylene, kerosene, Ultrasene, Varsol No. 1, Varsol No. 2, P–1 ink oil, P–2 ink oil, deodorized petroleum solvent No. 590, deodorized petroleum solvent No. 470, No. 80 white oil. Reference is made to the U.S. Patent No. 2,590,655 and to U.S. Patent 2,713,039 for a more complete description of the characteristics of the hydrocarbon solvents mentioned hereinabove by trade name.

In preparing the styrenated oil modified alkyd resins used in the present invention, monomeric styrene per se, or the ring-substituted styrenes may be used. Illustrative of this latter class of materials are the ring-substituted halostyrenes such as ortho, meta or para chlorostyrene, 2,4-dichlorostyrene, 2,5-dichlorostyrene, 3,4-dichlorostyrene and the like. Additionally, one can make use of the ring-substituted alkyl styrenes such as the ortho, meta or para methylstyrene, ortho, meta, or para ethylstyrene, 2,4-dimethylstyrene, 2,5-dimethylstyrene, 2,4,5-trimethylstyrene and the like. These styrene materials may be used either singly or in combination with one another. If it is desired to impart certain properties to the alkyd resin for particular purposes, one could make use of other polymerizable monomeric materials in combination with the styrenes such as those set forth hereinabove. Illustrative of these other polymerizable monomeric materials are vinylidene monomers and vinyl monomers such as acrylonitrile, methacrylonitrile, ethacrylonitrile, alpha chloro acrylonitrile and the like.

In the practice of the process of the present invention, relatively small amounts of an organic peroxide catalyst is introduced into the styrenated oil modified alkyd resin containing relatively small amounts of residual monomeric material and the mixture is heated to increase the viscosity of the resinous solution to the desired level. Illustrative of the types of organic peroxide catalysts which may be used are benzoyl peroxide, cumene hydroperoxide, tertiarybutyl hydroperoxide, ditertiarybutyl peroxide, 2,2'-bis(tertiarybutylperoxy)-butane, tertiarybutylpropyl peroxide, tertiarybutylpentamethylethyl peroxide and the like. These catalytic agents obviously can be used separately or in combination with one another. The actual amount of catalytic material used will depend on at least the viscosity of the styrenated alkyd resin to be treated and the ultimate viscosity desired. It will, of course, depend in some measure upon the amount of residual monomer remaining in the styrenated alkyd resin. Ordinarily, the styrenated alkyd resins to be treated will contain between about 0.5% and about 2% by weight based on the total weight of resin solution of residual monomer. Assuming said resin contains residual monomer in about that range, the amount of catalyst to be used will vary between about 0.04% and 0.10% by weight of catalyst based on the total weight of resin solution. If larger or smaller amounts of residual monomer remains in the styrenated alkyd resin solution, larger or smaller amount of catalyst may be used depending upon the extent to which viscosity increase is desired. It can be seen from this that if a specification requires that the viscosity of a given resin be increased from $Z_1$ to $Z_2$ in a resin containing about 2% residual monomer, one need not use as much catalytic material as one would need to use if the initial viscosity of the styrenated alkyd resin solution were X with a 3% residual monomer and an ultimate viscosity of $Z_2$ were desired.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Oil modified alkyd resin A

Into a suitable reaction vessel equipped with thermometer, stirrer and gas inlet and outlet tubes for purging the system, there is introduced 148 parts of phthalic anhydride, 73 parts of refined soya oil acids, 38 parts of refined soya oil, 120 parts of refined castor oil and 96 parts of 95% glycerine. The charge is heated gradually to about 280° C. and held at that temperature for approximately 2 hours using nitrogen gas to remove the water formed in the course of esterification. Thereafter, the charge is cooled down to about 245° C. and maintained at that temperature for approximately 4 hours. The finished resin is dissolved in xylol to give a 60% solution having the following characteristics: Acid Number, 2–5, Viscosity, $Z_1$–$Z_3$ (Gardner-Holdt), Color, 3–6 (Gardner 1933).

Interpolymer resin solution A

Into a suitable reaction vessel equipped with thermometer, stirrer and reflux condenser, there is introduced 55 parts of the oil modified alkyd resin A solids, 45 parts of monomeric styrene, 61 parts of xylene and 2 parts of cumene hydroperoxide. The charged ingredients are heated at a temperature of about 140–150° C. for about 6½ hours. At the end of this time, a 60% solids solution of the interpolymer had a viscosity of $Z_1+$ on the Gardner-Holdt scale. Continued heating of the interpolymer solution resulted in no significant increase in viscosity even though it was desired to increase the viscosity to about $Z_4$ to meet specifications.

EXAMPLE 1

1000 parts of the interpolymer resin solution A containing 60% resin solids and having a viscosity of $Z_1+$ is admixed with 0.61 parts of ditertiary butyl peroxide. The charged materials with constant stirring are heated gradually to about 130° C. in 1 hour and maintained at a temperature of about 135–138° C. for an additional 4 hours. The viscosity of the resultant interpolymer resin solution was $Z_4+$.

EXAMPLE 2

Example 1 is repeated using 1046 parts of interpolymer resin solution A containing 61.8% non-volatiles, 69 parts of xylene to reduce the non-volatiles to 58% and 1.15 parts of ditertiary butyl peroxide having a blend viscosity of $X+$. The materials are heated gradually over a 2-hour period to 135° C. The charge is then maintained at about 135–137° C. for an additional 6-hour period. The final viscosity was $Z_3+$. The final non-volatile content is 60.2%.

Interpolymer resin solution B

Into a suitable reaction vessel equipped with thermometer, stirrer and reflux condenser, there is introduced 55 parts of the oil modified alkyd A (solids), 45 parts of monomeric styrene, 100 parts of toluene and 2 parts of cumene hydroperoxide. The charged ingredients are heated at a temperature of about 110–120° C. for about 6½ hours. At the end of this time, a 50% solids solution of the interpolymer had a viscosity of V— on the Gardner-Holdt scale. Continued heating of the interpolymer solution resulted in no significant increase in viscosity even though it was desired to increase the viscosity to about $Z_1$–$Z_2$ to meet specifications.

EXAMPLE 3

One thousand parts of the interpolymer resin solution B containing 50% resin solids and having a viscosity of V— is admixed with 1.0 parts of ditertiary butyl peroxide.

The charged materials with constant stirring are heated gradually to about 115° C. and maintained at that temperature for about seven hours. The results are shown below:

| Hours | Temperature, °C. | Percent Non-Volatile | Viscosity | Viscosity at 50% Non-Volatile |
|---|---|---|---|---|
| 0 | 25 | 50.0 | V— | |
| 0.5 | 115 | 50.0 | V— | |
| 3.5 | 115 | 51.1 | X | X—. |
| 6.0 | 115 | 51.6 | $Z-Z_1$ | Z. |
| 7.0 | 115 | 51.7 | $Z_2$ | $Z_1-Z_2$. |

In carrying out the process of the present invention, the post-bodying temperature may be varied over a fairly wide range such as from about 90° C. up to reflux temperature which temperature will depend in considerable measure on the type of solvent being used. The lower temperatures will be utilized when the catalytic material being employed is not stable at the higher temperatures. Illustrative of that type of catalyst is benzoyl peroxide which is known to be a lower temperature catalyst. When a high temperature catalyst is being used, i.e., one which is stable at temperatures above 100° C. and up to about 215° C., one may utilize the higher temperatures up to and including the reflux temperature. Illustrative of this type of catalyst is the 2,2-bis(tertiarybutylperoxy)butane.

I claim:
1. A process for increasing the viscosity of a styrenated glyceride oil modified alkyd resin comprising introducing a small but effective amount of an organic peroxide catalyst into an inert organic solvent solution of a preformed styrenated oil modified alkyd resin containing minor amounts of residual styrene monomer, which cannot be made significantly more viscous by heating alone at conventional polymerization temperatures, and heating, at a temperature between about 90° C. and the reflux temperature, in the presence of said catalyst with constant agitation to effect the viscosity increase desired wherein said preformed alkyd resin is the reaction product of an aliphatic polyhydric alcohol, a polycarboxylic acid free of non-benzenoid unsaturation and a glyceride oil, reacted with a polymerizable styrene selected from the group consisting of styrene, ring-substituted halostyrenes and ring-substituted alkyl styrenes and wherein said polycarboxylic acid is present in an amount approximating at least 90% by weight based on the total amount of polycarboxylic acid used.

2. A process for increasing the viscosity of a styrenated glyceride oil modified alkyd resin comprising introducing a small but effective amount of tertiarybutyl hydroperoxide into an inert organic solvent solution of a preformed styrenated oil modified alkyd resin containing minor amounts of residual styrene monomer, which cannot be made significantly more viscous by heating alone at conventional polymerization temperatures, and heating, at a temperature between about 90° C. and the reflux temperature, in the presence of said catalyst with constant agitation to effect the viscosity increase desired wherein said preformed alkyd resin is the reaction product of an aliphatic polyhydric alcohol, a polycarboxylic acid free of non-benzenoid unsaturation and a glyceride oil, reacted with a polymerizable styrene selected from the group consisting of styrene, ring-substituted halostyrenes and ring-substituted alkyl styrenes and wherein said polycarboxylic acid is present in an amount approximating at least 90% by weight based on the total amount of polycarboxylic acid used.

3. A process for increasing the viscosity of a styrenated glyceride oil modified alkyd resin comprising introducing a small but effective amount of ditertiarybutyl peroxide into an inert organic solvent solution of a preformed styrenated oil modified alkyd resin containing minor amounts of residual styrene monomer, which cannot be made significantly more viscous by heating alone at conventional polymerization temperatures, and heating, at a temperature between about 90° C. and the reflux temperature, in the presence of said catalyst with constant agitation to effect the viscosity increase desired wherein said preformed alkyd resin is the reaction product of an aliphatic polyhydric alcohol, a polycarboxylic acid free of non-benzenoid unsaturation and a glyceride oil, reacted with a polymerizable styrene selected from the group consisting of styrene, ring-substituted halostyrenes and ring-substituted alkyl styrenes and wherein said polycarboxylic acid is present in an amount approximating at least 90% by weight based on the total amount of polycarboxylic acid used.

4. A process for increasing the viscosity of a styrenated glyceride oil modified alkyd resin comprising introducing a small but effective amount of cumene hydroperoxide into an inert organic solvent solution of a preformed styrenated oil modified alkyd resin containing minor amounts of residual styrene monomer, which cannot be made significantly more viscous by heating alone at conventional polymerization temperatures, and heating, at a temperature between about 90° C. and the reflux temperature, in the presence of said catalyst with constant agitation to effect the viscosity increase desired wherein said preformed alkyd resin is the reaction product of an aliphatic polyhydric alcohol, a polycarboxylic acid free of non-benzenoid unsaturation and a glyceride oil, reacted with a polymerizable styrene selected from the group consisting of styrene, ring-substituted halostyrenes and ring-substituted alkyl styrenes and wherein said polycarboxylic acid is present in an amount approximating at least 90% by weight based on the total amount of polycarboxylic acid used.

5. A process for increasing the viscosity of a styrenated glyceride oil modified alkyd resin comprising introducing a small but effective amount of 2,2-bis(tertiarybutylperoxy)butane into an inert organic solvent solution of a preformed styrenated oil modified alkyl resin containing minor amounts of residual styrene monomer, which cannot be made significantly more viscous by heating alone at conventional polymerization temperatures, and heating, at a temperature between about 90° C. and the reflux temperature, in the presence of said catalyst with constant agitation to effect the viscosity increase desired wherein said preformed alkyd resin is the reaction product of an aliphatic polyhydric alcohol, a polycarboxylic acid free of non-benzenoid unsaturation and a glyceride oil, reacted with a polymerizable styrene selected from the group consisting of styrene, ring-substituted halostyrenes and ring-substituted alkyl styrenes and wherein said polycarboxylic acid is present in an amount approximating at least 90% by weight based on the total amount of polycarboxylic acid used.

References Cited in the file of this patent

UNITED STATES PATENTS

| | | |
|---|---|---|
| 1,989,711 | Robinson | Feb. 5, 1935 |
| 2,713,039 | Cadwell et al. | July 12, 1955 |